(12) United States Patent
Johnson et al.

(10) Patent No.: US 8,365,868 B2
(45) Date of Patent: Feb. 5, 2013

(54) KIOSK

(75) Inventors: John Richard Johnson, Buford, GA (US); Andrew Colley, Dundee (GB)

(73) Assignee: NCR Corporation, Duluth, GA (US)

( * ) Notice: Subject to any disclaimer, the term of this patent is extended or adjusted under 35 U.S.C. 154(b) by 179 days.

(21) Appl. No.: 12/701,934

(22) Filed: Feb. 8, 2010

(65) Prior Publication Data

US 2011/0192681 A1    Aug. 11, 2011

(51) Int. Cl.
*G07F 9/10* (2006.01)

(52) U.S. Cl. .......................................... 186/52; 194/350

(58) Field of Classification Search ................ 186/53, 186/33; 902/8, 17, 21, 23, 30, 39, 40; 705/16, 705/17

See application file for complete search history.

(56) References Cited

U.S. PATENT DOCUMENTS

| | | | |
|---|---|---|---|
| 4,359,631 A * | 11/1982 | Lockwood et al. | 235/381 |
| 5,740,744 A * | 4/1998 | Nashirozawa et al. | 109/24.1 |
| 6,210,216 B1 * | 4/2001 | Tso-Chin et al. | 439/545 |
| 2001/0047441 A1 * | 11/2001 | Robertson | 710/65 |
| 2002/0046057 A1 * | 4/2002 | Ross | 705/1 |
| 2006/0092284 A1 * | 5/2006 | Goodman et al. | 348/207.99 |
| 2007/0088459 A1 * | 4/2007 | Pollard et al. | 700/234 |
| 2010/0205023 A1 * | 8/2010 | Wagner | 705/7 |
| 2011/0093316 A1 * | 4/2011 | Baker et al. | 705/14.4 |

\* cited by examiner

*Primary Examiner* — Mark Beauchaine
(74) *Attorney, Agent, or Firm* — Paul W. Martin

(57) ABSTRACT

A kiosk which is configurable to accept a plurality of different types of connections corresponding to a plurality of different types of customer media. In one example, the kiosk includes a mount; a computer in a first position on the mount including a touchscreen, a card reader, and a processor; a storage medium coupled to the processor containing content; and a content transfer device coupled to the processor. The content transfer device is configurable to include at least one connection of a plurality of different types of connections corresponding to a plurality of different types of customer media. The kiosk further includes a panel in a second position on the mount adjacent to the computer including at least one connection mounting location, and the at least one connection is removably mounted to the panel at the connection mounting location. The processor stores the content in the storage medium, operates the touch screen to display a menu of the content and to record selections made by a customer from the menu, operates the card reader to read a payment card of the customer as payment for content associated with the customer selections, and transfers the content associated with the customer selections to a removable storage medium of the customer.

11 Claims, 5 Drawing Sheets

KIOSK

BACKGROUND

Self-service computers have proven useful in many environments, such as retail, airline, hotel, entertainment, healthcare and financial industries.

It would be desirable to provide a kiosk with a modular design which is engaging and supports addition of environment-specific peripherals.

SUMMARY

A kiosk is provided.

In one example, the kiosk includes a mount; a computer in a first position on the mount including a touchscreen, a card reader, and a processor; a storage medium coupled to the processor containing content; and a content transfer device coupled to the processor. The content transfer device is configurable to include at least one connection of a plurality of different types of connections corresponding to a plurality of different types of customer media. The kiosk further includes a panel in a second position on the mount adjacent to the computer including at least one connection mounting location, and the at least one connection is removably mounted to the panel at the connection mounting location. The processor stores the content in the storage medium, operates the touch screen to display a menu of the content and to record selections made by a customer from the menu, operates the card reader to read a payment card of the customer as payment for content associated with the customer selections, and transfers the content associated with the customer selections to a removable storage medium of the customer.

DETAILED DESCRIPTION

Figure 1:
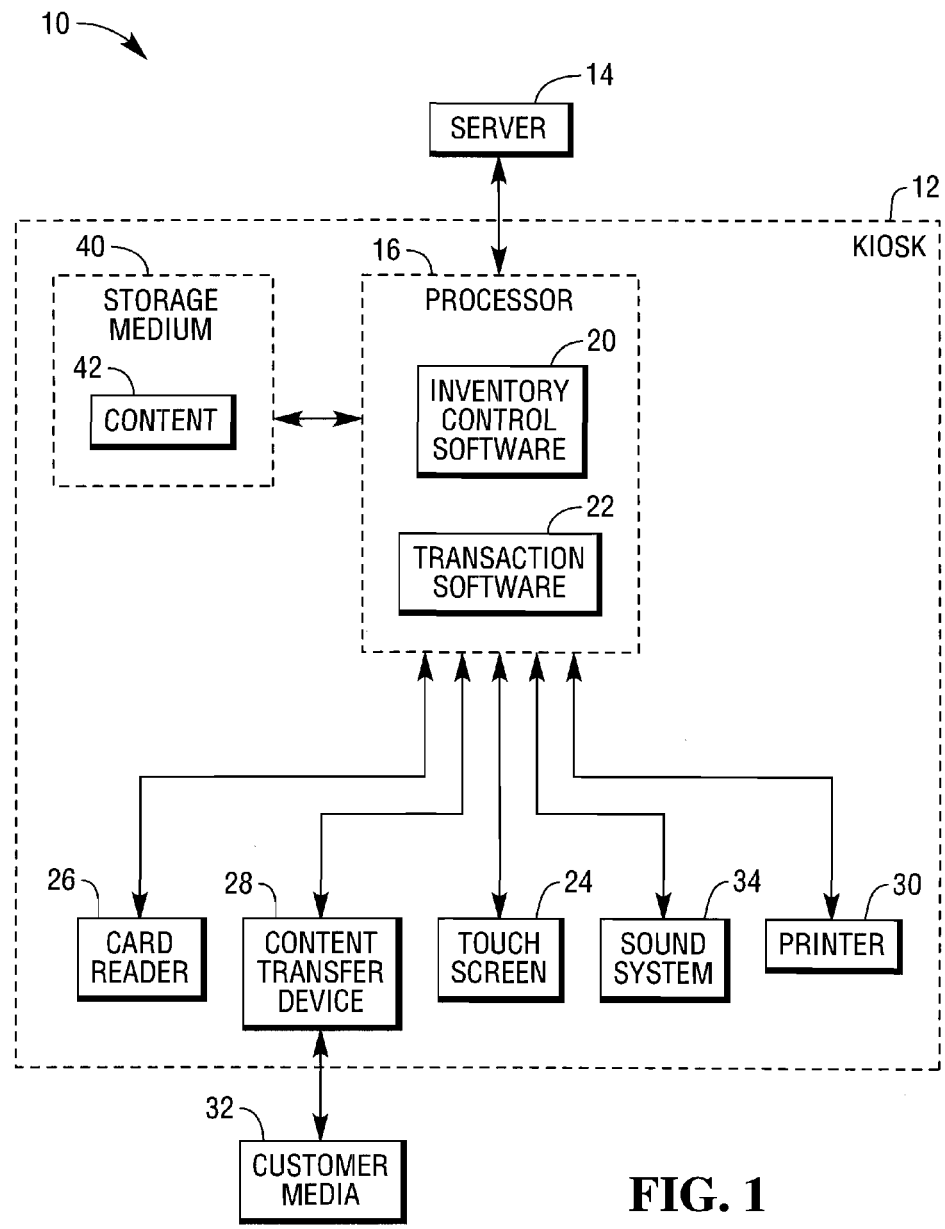
FIG. 1 is a block diagram of an example self-service system.

Referring now to FIG. 1, an example self-service system includes kiosk 12 and server 14. For purposes of this example, kiosk 12 is an entertainment kiosk for renting and/or selling entertainment content 42, such as movies, television shows, and games.

Kiosk 12 includes processor 16, which executes inventory control software 20 and transaction software 22. Inventory control software 20 controls retrieval of content 42 from server 14, storage of content 42 in storage medium 40, and retrieval of content 42 from storage medium 40. Inventory control software 20 further tracks rentals or sales of content 42.

Kiosk 12 may be coupled to server 14 via a network, including a wired network, a wireless network, or a combination of both. The wireless network may include a cellular network.

Transaction software 22 displays transaction screens, records user selections from content 42, and processes payment for selected content 42. Transaction software 22 may also play trailers, clips, and promotional material from content 42.

Kiosk 12 executes an operating system such as a Microsoft operating system, which can display screen information within one or more windows. The operating system may include a plug-and-play operating system capable of detecting connection of customer medium 32.

Kiosk 12 may include peripherals necessary to accomplish its purpose. In the example embodiment, the peripherals may include touch screen 24, card reader 26, content transfer device 28, printer 30, and sound system 34.

Touch screen 24 displays transaction screens of transaction software 22 and records customer selections.

Card reader 26 reads customer payment cards and may additionally read customer loyalty cards. Card reader 26 may include a magnetic stripe reader.

Content transfer device 28 transfers selected content 42 to customer medium 32. Customer medium 32 may include a flash memory card, such as a secure digital (SD) card, a universal serial bus (USB) flash memory stick (also known as a thumb drive, memory key, or jump drive), an external hard drive, or other type of storage media suited for a temporary connection and removal from processor 16 through content transfer device 28. Customer medium 32 includes media owned by the customer.

In the example embodiment, content transfer device 28 includes a USB controller and hub with USB ports, and optionally one or more USB peripherals coupled to the USB ports. For example, in some venues, content transfer device 28 may include a USB controller and an SD card reader/writer coupled to the USB controller. In other venues, content transfer device 28 may include just a USB controller with an exposed USB port to which a customer may connect a USB flash memory stick. In still other venues, content transfer device 28 may accommodate multiple different types of customer medium 32, for example, both a USB flash memory stick and an SD card.

In other example embodiments, content transfer device 28 may include other types of data transfer interfaces besides USB.

Printer 30 prints receipts and may additionally print promotions and coupons. Printer 30 may include a thermal printer.

Sound system 34 may include sound producing circuitry and speakers. Sound system 34 produces sounds from content 42 and from transaction software 22.

During a typical transaction, transaction software 22 displays transaction screens including a plurality of choices, optionally including voice instructions and multimedia content. A customer may browse the choices and select one or more movies, games, or other content 42. Following a customer selection, transaction software 22 displays screens containing preview options, prices, and payment options. Transaction software 22 may play excerpts from selected content, including sounds.

When the customer is ready to purchase a selection, transaction software 22 records customer payment through card reader 26. Transaction software 22 provides a prompt to couple customer medium 32 to content transfer device 28. Following coupling of customer medium 32, transaction software 24 downloads selected content 42 to customer medium 32 via inventory control software 20. When downloading is finished, transaction software 24 provides a prompt to remove customer medium 32. Inventory control software 20 records details of the transaction. Transaction software 24 prints a receipt via printer 30.

If a customer wishes to purchase or rent a movie, game, or other content 42 that is not stored locally within storage medium 40, transaction software 22 may request that the desired content 42 be downloaded from server 14 by inventory control software 20.

The customer may then insert customer medium 32 into televisions, computers, and other entertainment devices that also include content transfer device 28.

Figure 2:
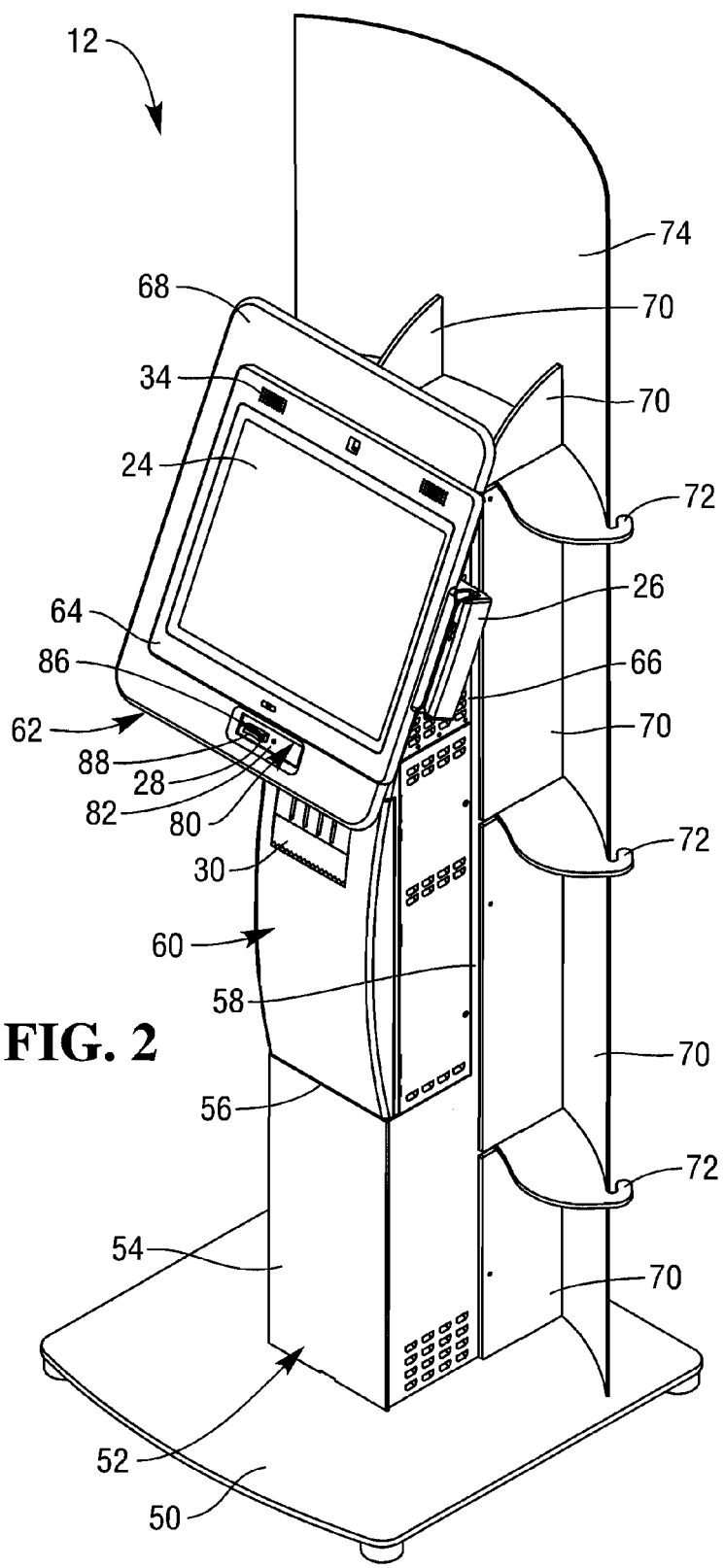
FIG. 2 is a perspective view of an example self-service system.
Figure 3:
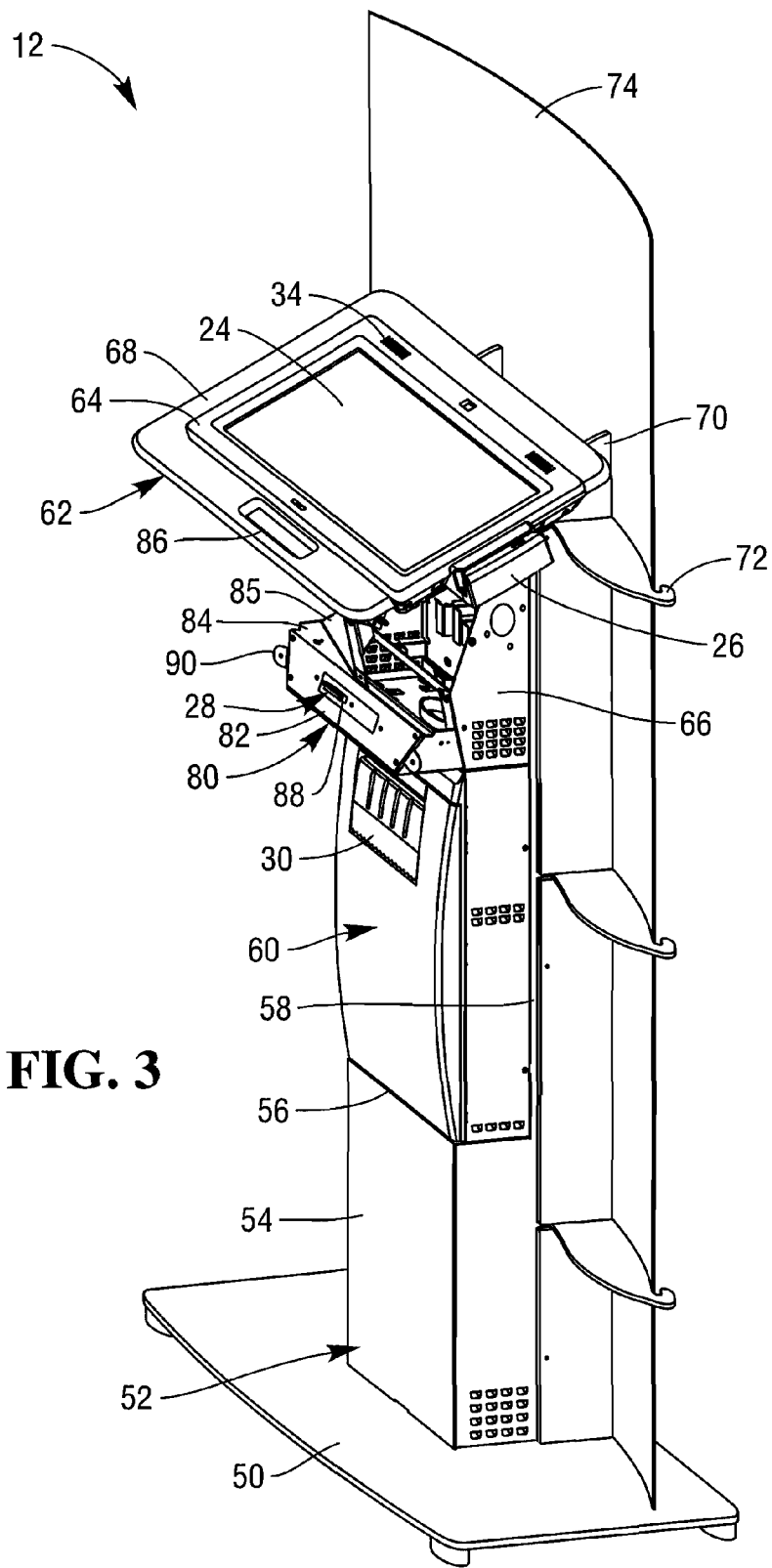
FIG. 3 is a perspective view of the example self-service system with a computer module rotated upwards.

Turning now to FIGS. 2-3, an example kiosk 12 is illustrated in further detail.

Example kiosk 12 is modular in nature. Base 50 is relatively flat and has a large enough footprint to minimize the chance of tipping of kiosk 50. Vertical support 52 fastens to base 50. Together, base 50 and vertical support 52 form a pedestal structure for supporting printer module 60 and computer module 62.

Vertical support 52 includes a bottom portion 54 and back portion 58. Bottom portion 54 includes a shelf 56.

Back portion 58 extends upwardly beyond shelf 56 and provides raceways for routing power and data cables from printer module 60 and computer module 62 into bottom portion 54.

Back portion 58 additionally supports mounting of sign 74, which includes graphical marketing information. Support pieces 70 fasten to back portion 58. Sign retainers 72 are flat, interlocking pieces located in gaps between support pieces. The ends of sign retainers 72 form a channel for retaining sign 74, which is inserted or removed from the channel from above. Sign 74 may be directly shipped to an installation site, separate from kiosk 12.

Printer module 60 contains printer 30 and paper. Printer module 60 is mounted on shelf 56 against back portion 58.

Computer module 62 includes computer 64 and computer mount 66.

Computer 64 includes processor 16, touch screen 24, card reader 26, and storage medium 40. Computer 64 may include a model 7409 computer manufactured by the assignee of the present application; however, other computers are envisioned as well.

Computer mount 66 includes right and left side members with front side edges inclined at an upward angle for mounting computer 64 at a comfortable viewing and operating angle. Computer 64 is mounted on a hinge, which allows computer 64 to rotate between operating and servicing positions. Rotates upwards, computer 64 exposes the inside of computer mount 66 for servicing (FIG. 3).

Computer module 62 additionally includes content transfer panel assembly 80, which fastens to the front of computer mount 66, below computer 64. Content transfer panel assembly 80 holds a customer accessible portion of content transfer device 28.

Content transfer panel assembly 80 includes a front side member 82, which in this example includes an SD card reader/writer 88 for connecting a customer USB flash memory. Front side member 82 couples to right and left side members 84.

Content transfer panel assembly 80 further includes rear side members 85 which couple to right and left side members 84 and fasten to computer mount 66.

Content transfer panel assembly 80 may further include tabs 90 for securing content transfer panel assembly 80 to the rear surface of fascia 68. Fasteners may include screws.

Fascia 68 is fastened to computer 64. Example fascia 68 is located around computer 64, adjacent each side except the side occupied by card reader 26. Fascia may contain instructions for using computer 64. Fascia 68 includes aperture 86 for exposing content transfer device 28.

Following removal of fasteners from tabs 90, fascia 68 and computer 64 are free to rotate to expose content transfer panel assembly 80.

Figure 4:
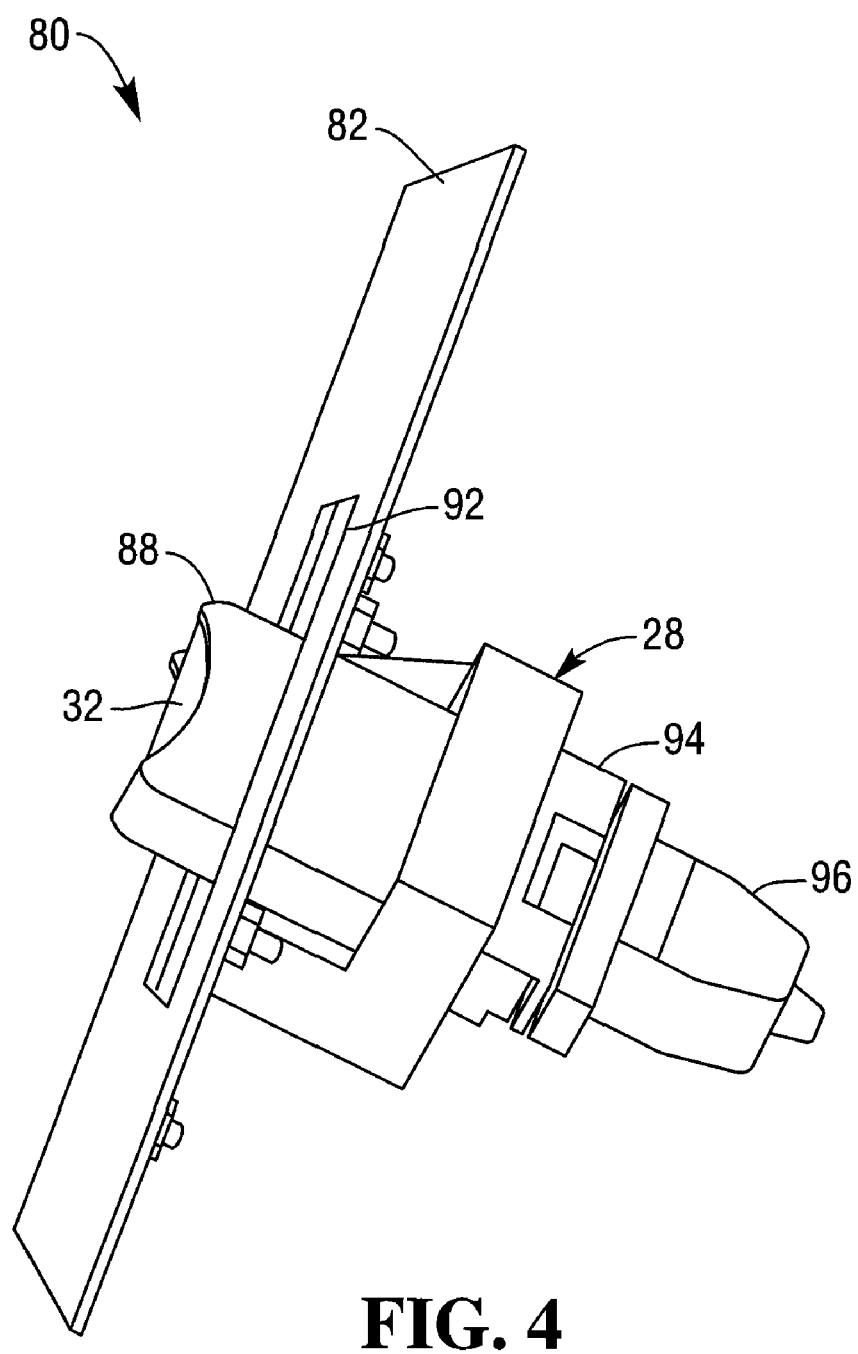
FIG. 4 is a perspective view of a bracket assembly including an example content transfer device of the example self-service system.

With reference to FIG. 4, content transfer panel assembly 80 is shown in further detail. Front side member 82 includes aperture 92 through which SD card reader/writer 88 protrudes from behind. Aperture 92 is wide enough to accommodate one or more USB peripherals or connectors. SD card reader/writer 88 is held in place by bracket 94, which fastens to the rear surface of front side member 82. A USB cable 96 couples SD card reader/writer 88 to computer 64.

Figure 5:
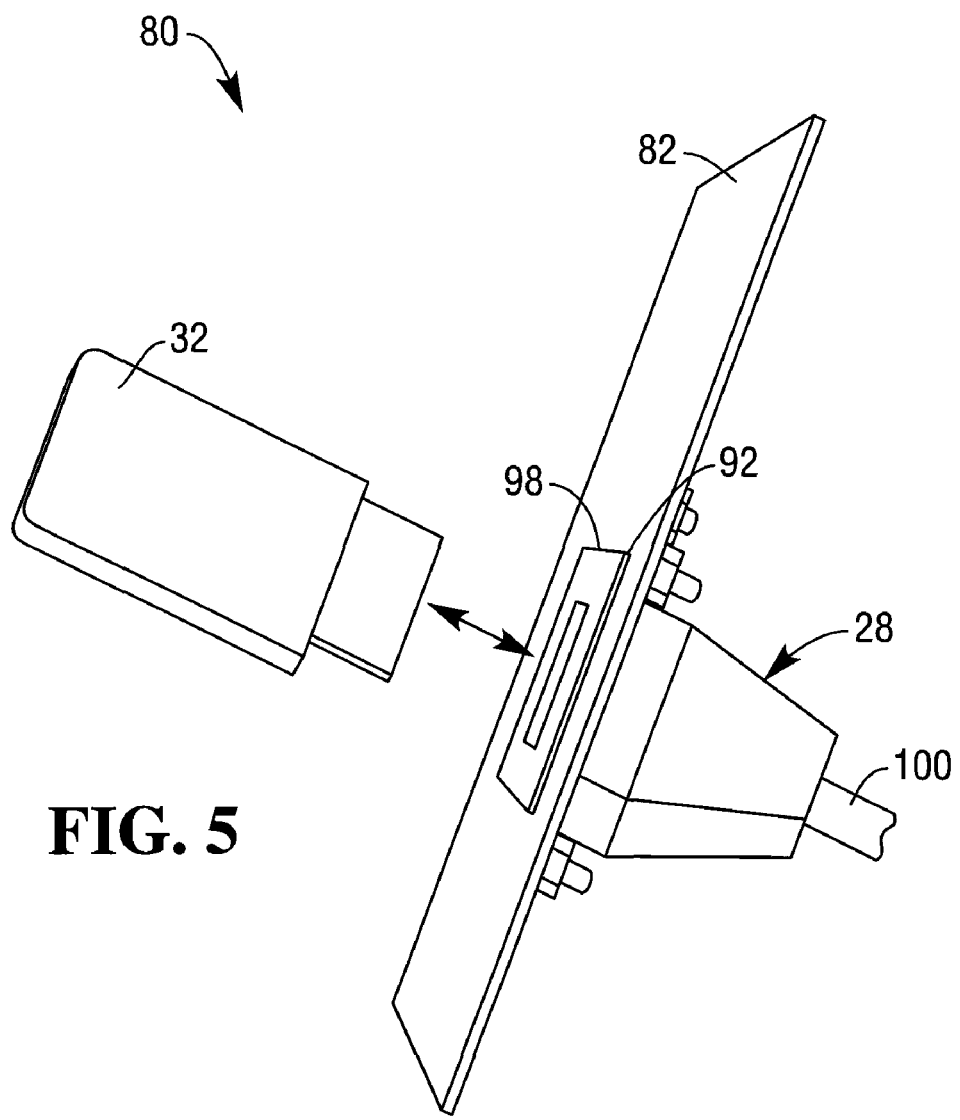
FIG. 5 is a perspective view of the bracket assembly including another example content transfer device of the example self-service system.

With reference to FIG. 5, content transfer panel assembly 80 is shown with a different content transfer device 28. A USB terminal 98 fastens to the rear surface of front side member 82. A USB cable 100 couples to USB terminal 98 to computer 64.

Different content transfer devices 28, including different types of connections to customer medium 32, may be easily added or removed. For example, with a USB controller, one or more different USB peripherals or USB terminals may be connected to the USB controller and mounted to front side member 82. Transaction software 22, the operating system, or a combination of both may automatically determine the peripheral or terminal connection that is coupled to customer medium 32.

Although particular reference has been made to certain embodiments, variations and modifications are also envisioned within the spirit and scope of the following claims.

The invention claimed is:

1. A kiosk comprising:

a mount;

a computer in a first position on the mount including a touchscreen, a card reader on one side of the touch screen, and a processor;

a storage medium coupled to the processor containing digital content;

a digital content transfer device coupled to the processor;

wherein the digital content transfer device is configurable to include at least one connection of a plurality of different types of connections corresponding to a plurality of different types of customer removable digital content storage media;

a panel in a second position on the mount adjacent to the computer including at least one connection mounting location, and wherein the at least one connection is removably mounted to the panel at the connection mounting location; and wherein the processor is for storing the digital content in the storage medium, for operating the touch screen to display a menu of the digital content and to record selections made by a customer from the menu, for operating the card reader to read a payment card of the customer as payment for digital content associated with the customer selections, and for transferring the digital content associated with the customer selections through the at least one connection to a corresponding type of removable digital content storage medium of the customer; and a fascia affixed to the computer adjacent each side of the touch screen except the one side and containing an aperture through which the at least one connection is accessible to the customer to connect the removable digital content storage medium.

2. The kiosk of claim 1, wherein the mount comprises a hinge about which the computer and the fascia rotate between an operating position of the computer and a servicing position of the computer, and wherein the digital content transfer device is accessible for reconfiguration to another type of connection when the computer is in the servicing position.

3. The kiosk of claim 2, wherein the second position is below the first position and wherein the digital content transfer device is accessible for reconfiguration when the computer and the fascia are rotated upwards about the hinge.

4. The kiosk of claim 2, wherein the fascia is secured to the panel to prevent rotation of the computer.

5. The kiosk of claim 1, wherein the digital content transfer device comprises a USB controller, a USB hub, and a USB port, and wherein the removable digital content storage medium of the customer couples to the USB port.

6. The kiosk of claim 1, wherein the digital content transfer device comprises a USB controller, a USB hub, and a USB port, and a USB card reader/writer, wherein the removable digital content storage medium of the customer is inserted with the USB card reader/writer.

7. The kiosk of claim 1, further comprising a pedestal for supporting the mount.

8. The kiosk of claim 7, further comprising a printer in the pedestal for printing a receipt following the payment.

9. A kiosk comprising:
a first module including a computer, a storage medium, a touch screen, a payment card reader adjacent one side of the touch screen, and a digital content transfer device for receiving a customer digital content storage medium; and
a fascia affixed to the computer around each side of the touch screen except the one side and containing an aperture through which the digital content transfer device is accessible to a customer to connect the customer digital content storage medium;
wherein the processor is for storing digital content in the storage medium, for operating the touch screen to display a menu of the digital content and to record selections made by the customer from the menu, for operating the card reader to read a payment card of the customer as payment for digital content associated with the customer selections, and for transferring the digital content associated with the customer selections to the customer digital content storage medium through the digital content transfer device.

10. The kiosk of claim 9, further comprising:
a second module below the first module including a receipt printer coupled to the computer for printing a customer receipt and a housing for the receipt printer; and
a third module below the second module including a base for supporting the first and second modules on a horizontal surface.

11. A kiosk comprising:
a mount;
a computer in a first position on the mount including a touch screen, a card reader, and a processor;
a storage medium coupled to the processor containing content;
a content transfer device coupled to the processor;
wherein the content transfer device is configurable to include at least one connection of a plurality of different types of connections corresponding to a plurality of different types of customer media;
a panel in a second position on the mount adjacent to the computer including at least one connection mounting location, and wherein the at least one connection is removably mounted to the panel at the connection mounting location;
wherein the processor is for storing the content in the storage medium, for operating the touch screen to display a menu of the content and to record selections made by a customer from the menu, for operating the card reader to read a payment card of the customer as payment for content associated with the customer selections, and for transferring the content associated with the customer selections to a removable storage medium of the customer;
wherein the mount comprises a hinge about which the computer rotates between an operating position and a servicing position, and wherein the content transfer device is accessible for reconfiguration when the computer is in the servicing position;
wherein the second position is below the first position and wherein the content transfer device is accessible for reconfiguration when the computer is rotated upwards about the hinge; and
a fascia around a portion of the touch screen containing an aperture through which the content transfer device is accessible to the customer;
wherein the fascia is secured to the panel to prevent rotation of the computer.

* * * * *